United States Patent [19]
Woleslagle et al.

[11] Patent Number: 5,983,633
[45] Date of Patent: Nov. 16, 1999

[54] ELECTRONICALLY CONTROLLED WATER INJECTION SYSTEM

[75] Inventors: Robert B. Woleslagle; Richard K. Bennett; Stephen Clay Masters, all of El Paso, Tex.

[73] Assignee: Autotronic Controls Corporation, El Paso, Tex.

[21] Appl. No.: 08/865,791

[22] Filed: May 30, 1997

[51] Int. Cl.$^6$ .................................................. F02B 27/02
[52] U.S. Cl. ................................................. 60/312; 60/314
[58] Field of Search .............................. 60/312, 313, 314

[56] References Cited

U.S. PATENT DOCUMENTS

| | | | |
|---|---|---|---|
| 3,385,052 | 5/1968 | Holtermann et al. ................ | 60/312 |
| 3,813,880 | 6/1974 | Reid et al. . | |
| 4,539,813 | 9/1985 | Tomita et al. .................... | 60/314 |
| 4,643,272 | 2/1987 | Gaffrig . | |
| 4,827,718 | 5/1989 | Tervi ............................. | 60/314 |
| 4,920,745 | 5/1990 | Gilbert .......................... | 60/314 |
| 4,940,435 | 7/1990 | Osborn et al. ................... | 60/313 |
| 5,078,630 | 1/1992 | Katsumata . | |
| 5,259,797 | 11/1993 | Miles, Jr. et al. . | |
| 5,554,058 | 9/1996 | LeQuire . | |
| 5,746,054 | 5/1998 | Matte ............................ | 60/314 |

*Primary Examiner*—Thomas E. Denion
*Attorney, Agent, or Firm*—Fitch, Even, Tabin & Flannery

[57] ABSTRACT

An exhaust system tuned during low RPM operation while the exhaust chamber retains its preset tuning for optimal high RPM operation. An exhaust controller according to an embodiment of the present invention receives an RPM signal from the engine and processes the signal to activate a solenoid which controls a valve that injects coolant water into the exhaust chamber. The injection of the water into the exhaust chamber has the effect of cooling the exhaust gases, thereby increasing the density of the exhaust charge in the chamber and slowing the exhaust pulse wave, thereby optimizing performance at relatively lower RPM levels.

15 Claims, 7 Drawing Sheets

| Fig.5A |
| Fig.5B |

ELECTRONICALLY CONTROLLED WATER INJECTION SYSTEM

BACKGROUND OF THE INVENTION

1. Field of the Invention

The present invention relates to exhaust systems for internal combustion engines and, particularly, to an exhaust system having an exhaust chamber.

2. Description of the Related Art

Exhaust systems for engines, such as two stroke engines installed in vehicles such as personal watercraft, have exhaust chambers that are carefully tuned or shaped to a particular configuration so as to produce optimal engine performance. The purpose of this tuning is to cause exhaust pulse sound waves to reflect inside the exhaust chamber thereby creating local pressure variations. The pressure variations either help scavenge the remaining exhaust gases or plug the exhaust port to prevent the intake charge from exiting into the exhaust.

Exhaust chambers in typical systems are tuned for a particular RPM level. However, the more precisely the system is tuned for a particular RPM level, the more performance throughout the rest of the RPM range will suffer. The speed of the exhaust pulse wave changes according to the formula $v=(xkT)^{1/2}$, where x is the ratio of specific heat at constant pressure to specific heat of constant volume, k is the gas constant per unit mass and T is the temperature in Kelvins.

As RPM level increases, temperature increases. Since high speed performance is generally emphasized, the exhaust chamber is designed to be relatively short in order to reflect the high speed sound wave at the elevated exhaust temperatures of high RPM engine operation. Such a design, however, adversely affects performance at lower RPM levels, where the reflected exhaust pulse wave reaches the engine exhaust port too early to optimally seal the engine exhaust port during the compression stroke.

Accordingly, there is a need for an exhaust system which can be tuned to produce maximum power at a plurality of an engine's RPM levels. There is more particularly a need for a system which optimizes engine power at relatively lower RPM levels. There is a still further need for a system in which an exhaust pulse wave reaches the engine exhaust port at a time adequate to effectively seal the engine exhaust port during the compression stroke at lower RPM levels.

SUMMARY OF THE INVENTION

These and other drawbacks of the prior art are overcome in large part by controlling operation of the exhaust chamber. A tunable exhaust system according to the present invention is effectively optimized during low RPM operation while the exhaust chamber retains its short length tuning for optimal high RPM operation. An exhaust controller according to an embodiment of the present invention receives an RPM signal from the engine and processes the signal to activate a solenoid which controls a valve that injects coolant water into the exhaust chamber from the main water flow to the engine. The injection of the water into the exhaust chamber has the effect of cooling the exhaust gases, thereby increasing the density of the exhaust charge in the chamber and slowing the exhaust pulse wave. This has the same effect as mechanically adjusting the chamber to increase torque and horsepower at low and mid-engine RPM.

In one embodiment of the present invention, opening and closing of a spray nozzle valve is controlled by a solenoid which, in turn, is controlled through pulse width modulation (PWM) circuitry. The PWM circuitry receives the engine RPM signal and, depending upon RPM levels, generates a PWM signal having a predetermined duty cycle. The solenoid pulses, opening and closing the valve according to the PWM duty cycle. In another embodiment, the opening and closing of the valve is configured such that a quantity of water injected into the exhaust chamber is a linear function of engine RPM level.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
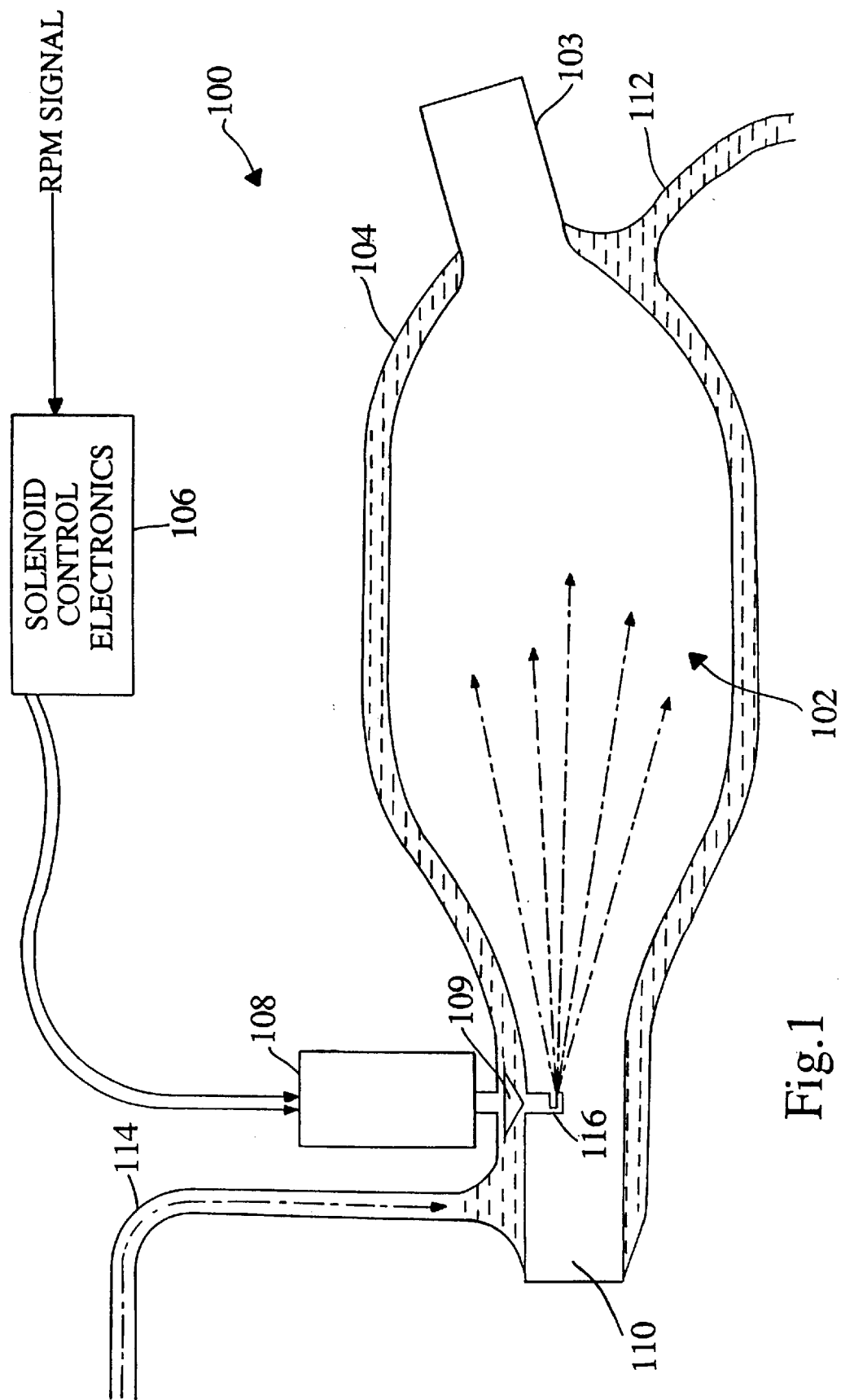
FIG. 1 is a diagram illustrating a tunable exhaust system according to one embodiment of the present invention.

Turning now to the drawings, and with particular attention to FIG. 1, a diagram illustrating an embodiment of the present invention is shown. A tunable exhaust system 100 includes an exhaust chamber 102 having an exhaust cooling jacket 104. The exhaust chamber 102 is coupled to an exhaust port 110 of an engine (not shown). The exhaust chamber 102 receives exhaust gases from the exhaust port 110 and expels them from the engine exit port 103. The exhaust cooling jacket 104 includes a pressurized water supply 114, from which water or coolant is received, and an outlet 112 from which coolant water is expelled. In a typical water craft environment, the water is received from sources external to the water craft, though the coolant water may also be supplied from an on-board source.

The exhaust system 100 further includes a solenoid 108 which communicates with the exhaust chamber 102. The solenoid 108 controls a valve 109 which allows water from the cooling jacket 104 to be sprayed into the exhaust chamber 102 through a spray nozzle 116. The solenoid 108 is coupled to solenoid control electronics 106, which will be discussed in greater detail below. The solenoid control electronics 106 receive an engine RPM signal either from an ignition system or from a spark plug pick-up. The solenoid control electronics 106 count the RPM level and control the pulsing of the solenoid 108 to activate the valve 109 to permit predetermined amounts of water from the exhaust cooling jacket 104 into the exhaust chamber 102. In one embodiment, the solenoid control electronics 106 include a pulse width modulation (PWM) circuit which provides a signal to the solenoid 108. The valve 109 is opened and closed according to the PWM duty cycle to regulate the amount of water allowed into the exhaust chamber 102. As discussed above, the amount of water or coolant injected into the exhaust chamber 102 is regulated such that the chamber is effectively lengthened at low RPM operation while the exhaust chamber 102 retains its preset tuning during high RPM operation.

Figure 2:
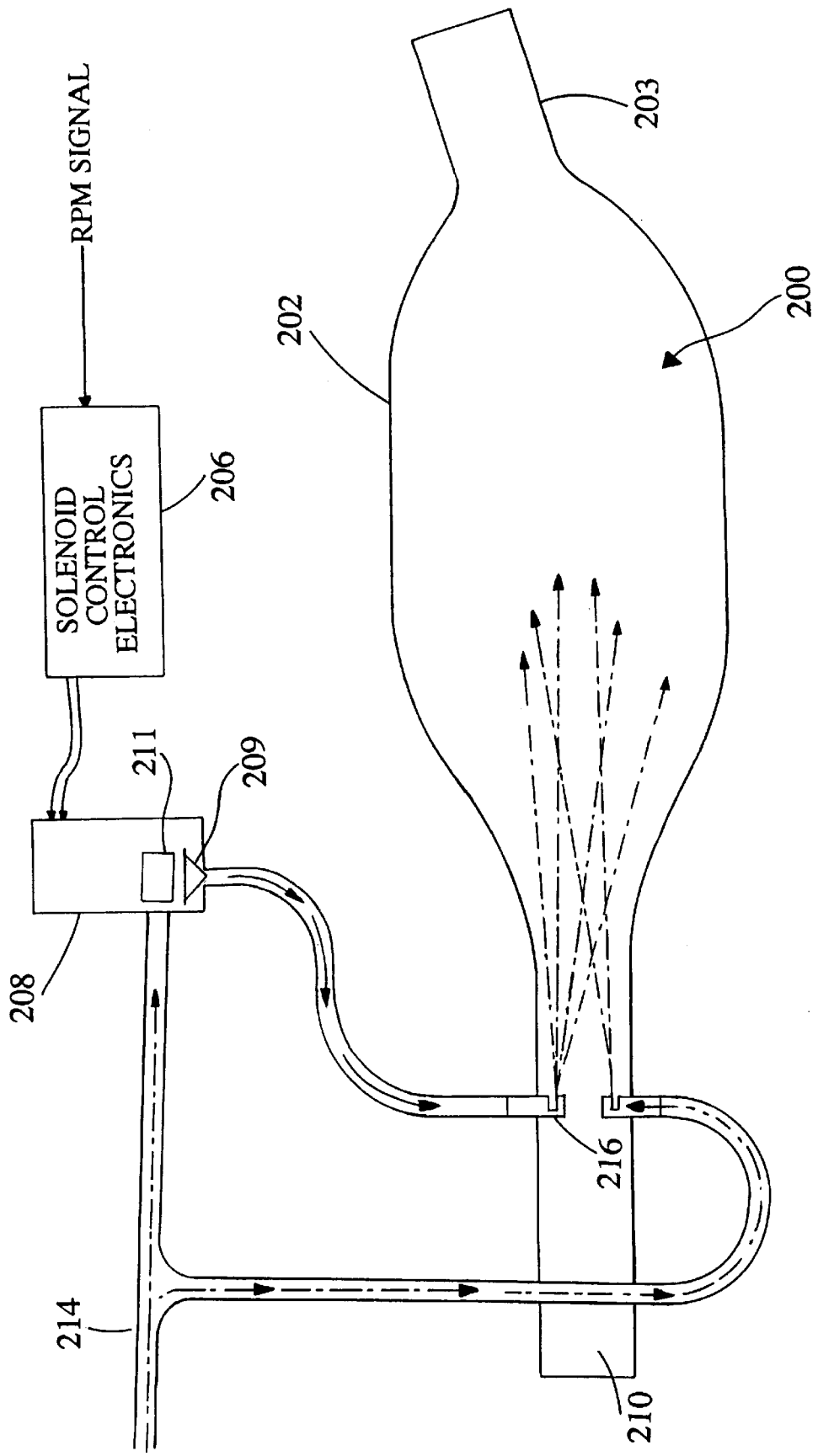
FIG. 2 is a diagram of an alternate embodiment of a tunable exhaust system according to the present invention.

An alternate embodiment of an exhaust system according to the present invention is illustrated in FIG. 2. A tunable exhaust system 200 includes an exhaust chamber 202 coupled to an exhaust port 210 of an engine (not shown). In the embodiment of FIG. 2, coolant water is provided into the exhaust chamber 202 at a predetermined and regulated rate. As illustrated, no exhaust cooling jacket 104, as shown in FIG. 1, is provided. A pressurized water supply 214 provides water both directly to the exhaust chamber 202 and to a solenoid valve 208. The solenoid valve 208 includes a solenoid 211 and a valve 209 which regulates an additional amount of coolant water for tuning the exhaust directed into the exhaust chamber 202 via the spray nozzle 216. The solenoid 211 and valve 209 are coupled to the solenoid control electronics 206. As in the embodiment of FIG. 1, the solenoid control electronics 206 receive an engine RPM signal, either from an ignition controller or from a spark plug pick-up. In one embodiment, the solenoid control electronics 206 include pulse width modulation (PWM) circuitry which provides a control signal to the solenoid valve to regulate an amount of coolant water allowed into the exhaust chamber 202 via the spray nozzle 216. Again, the amount of water provided to the exhaust chamber 202 is a function of the engine RPM and temperature. In particular, the amount of water is provided to adjust the exhaust chamber 202 such that low RPM operation is optimized.

Figure 3A:
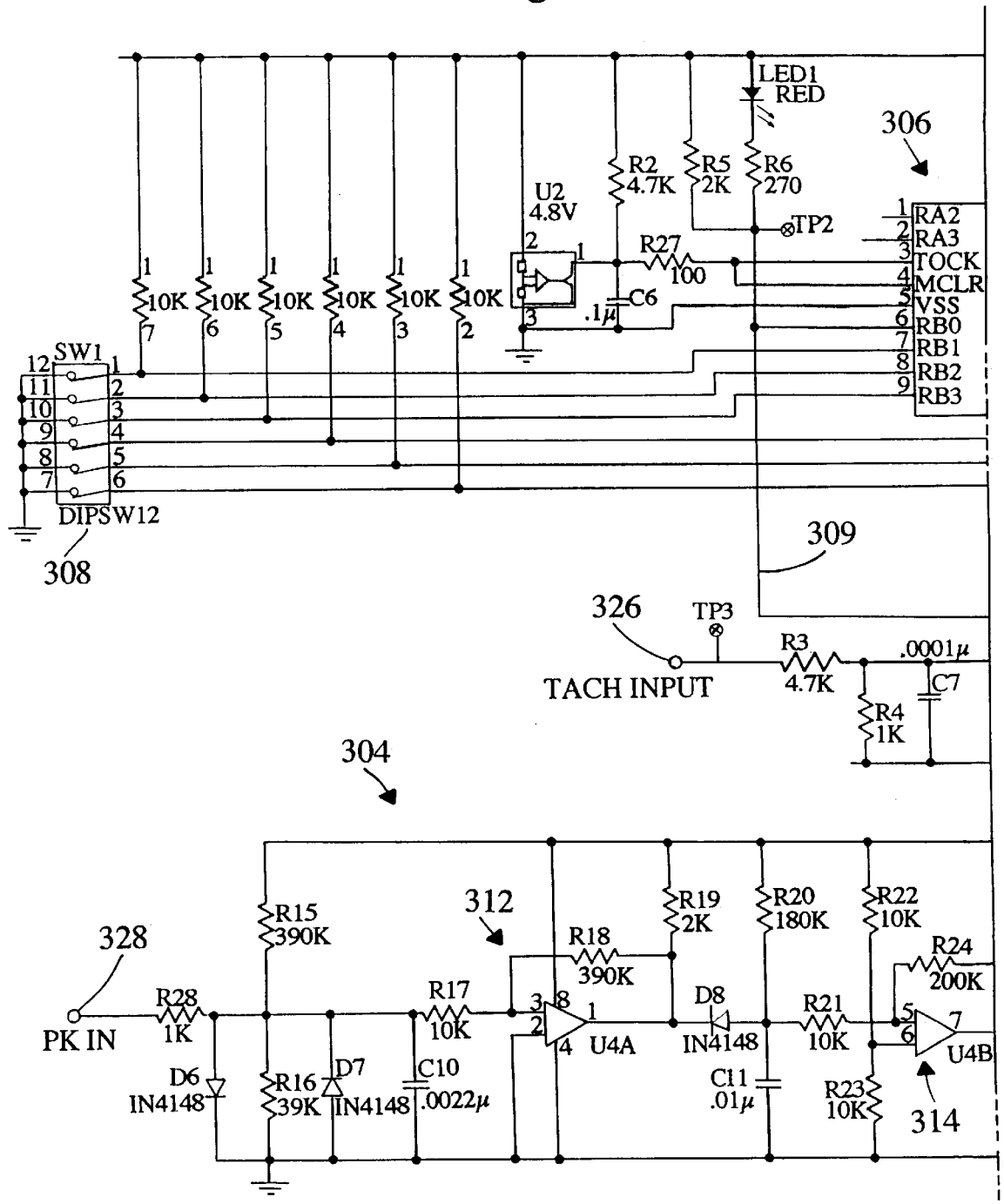
FIG. 3 is a diagram of a controller for an exhaust system according to an embodiment of the present invention.
Figure 3B:
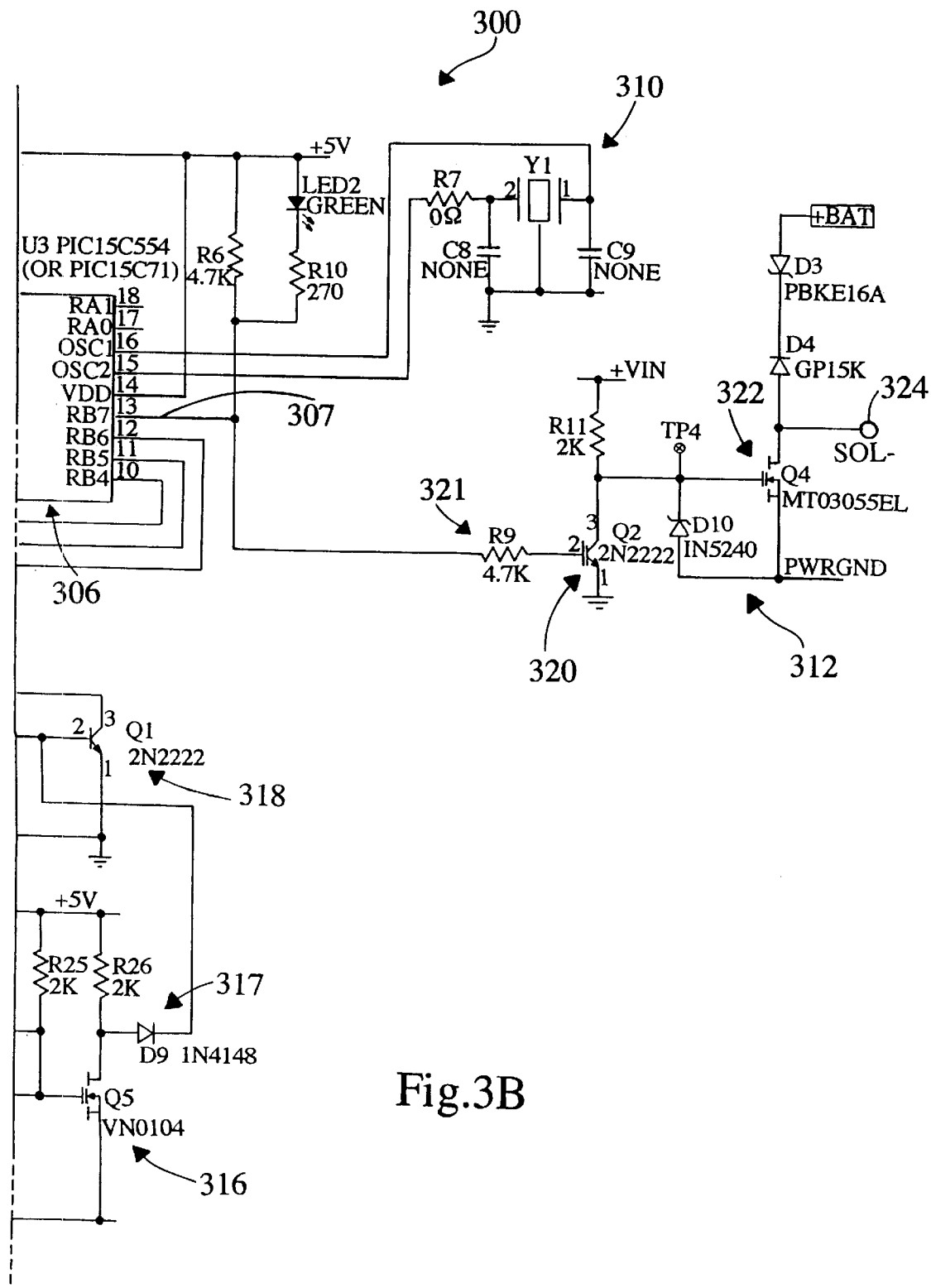

Turning now to FIG. 3, a circuit diagram of exemplary solenoid control electronics according to an embodiment of the present invention is illustrated. The solenoid control electronics 300 include a microcontroller 306 having a pulse width modulation output provided on line 307. The pulse width modulation output 307 is provided to the solenoid conditioning circuitry 312, which will be discussed in greater detail below. The microcontroller 306 is preferably a TIC15C554 or a TIC16C71 microcontroller available from Microchip Industries, though a variety of microcontrollers and/or microprocessors may be employed.

The microcontroller 306 receives an engine RPM signal along line 309. The engine RPM signal along line 309 is received either from a tachometer input 326 or from a pick-up input 328. The tachometer input 326 may be a periodic square wave received from an MSD™ watercraft ignition system available from MSD Ignitions, El Paso, Tex. Alternatively, the engine RPM signal along line 309 may be received via a pick-up input 328 connected directly to a spark plug wire. The pick-up input 328, in turn, is provided to pick-up conditioning circuitry 304 before being provided to the microcontroller engine RPM input 309. The microcontroller 306 also is coupled to an oscillator circuit 310 to provide various clocking and/or timing references.

In one embodiment, the microcontroller 306 is user programmable by way of a bank of DIP switches 308. The switches 308 are user configurable to set or specify an RPM level at which the water level being sprayed into the exhaust chamber is FULL ON (in one embodiment, water begins to be injected into the exhaust chamber at 3,000 RPM). The bank of DIP switches 308 is further used to specify one of four speeds at which water begins to be turned off, and one of four speeds at which water is completely off (for each of the four BEGIN WATER TURN OFF RPM levels). Finally, the bank of DIP switches 308 is used to select the number of cylinders in the engine. Specific relationships and switch settings for an exemplary embodiment of the present invention are illustrated in Table 1 set forth below:

TABLE 1

| TURN ON SLOPE FULL ON SPEED | | BEGIN WATER TURN OFF SPEED | | | WATER FULL OFF OFFSET SPEED | | | CYLINDER SELECT | |
|---|---|---|---|---|---|---|---|---|---|
| 100% RPM | S1 | RPM | S2 | S3 | RPM | S4 | S5 | CYL. | S6 |
| 4000 | OFF | 4500 | OFF | OFF | +750 | OFF | OFF | 2 | OFF |
| 3500 | ON | 5000 | ON | OFF | +1000 | ON | OFF | 3 | ON |
| | | 5500 | OFF | ON | +1250 | OFF | ON | | |
| | | 6000 | ON | ON | +1500 | ON | ON | | |

Figure 4:
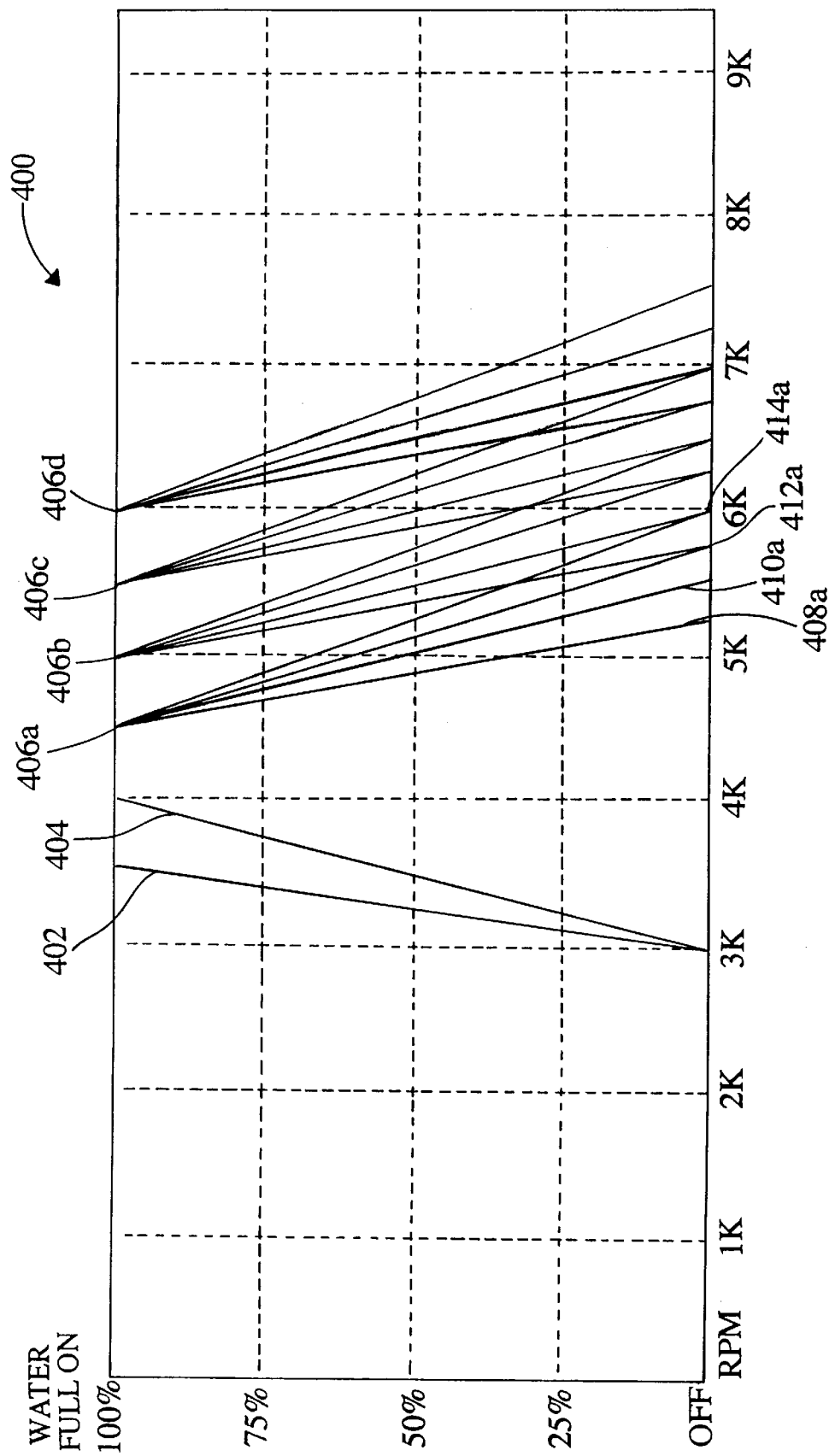
FIG. 4 is a graph of water level versus RPM according to an embodiment of the present invention.

The exemplary TURN ON and RPM relationships are further illustrated in FIG. 4, which shows a graph of WATER ON versus RPM 400. Graph 400 includes a pair of lines 402, 404 which begin at 3,000 RPM and end at 3,500 and 4,000 RPM, respectively. The output slopes are user selectable by programming DIP switches 308. The lines 402, 404 thus illustrate amounts of water injected into the exhaust chamber for purposes of effectively lengthening the exhaust chamber size. Physically, the slopes represent faster or slower PWM output duty cycles. In one embodiment, the PWM period is 40 milliseconds, corresponding to a frequency of 25 hertz. The faster the duty cycle changes from 100% to 0% (or from 0% to 100%) the faster the WATER FULL ON level is achieved.

FIG. 4 identifies four points 406a, 406b, 406c and 406d, which represent RPM levels at which the rate at which water is introduced into the exhaust chamber may be programmed to begin to decrease. Each BEGIN WATER TURN OFF RPM level identified by the four points 406a–406d is further associated with four WATER OFF slope lines 408a, 410a, 412a, 414a, for example. Again, the WATER OFF lines 408a, 410a, 412a, 414a represent the speed at which the solenoid PWM duty cycle changes. It is noted that while two WATER ON lines 404, 402, four BEGIN WATER TURN OFF points 406a–406d and four associated WATER OFF lines 408a, 410a, 412a, 414a are illustrated, FIG. 4 is exemplary only. Thus, for example, a different predetermined number of DIP switches may be provided to allow greater selectivity of the water/RPM relationship. Alternatively, different programming control mechanisms, such as a keyboard or computer having a graphical user interface, are contemplated.

Turning back to FIG. 3, as discussed above, a pulse width modulated output 307 is provided from the microcontroller 306 to a solenoid conditioning circuit 312. The solenoid conditioning circuit 312 includes an input resistor 321 coupled to the base of a bipolar junction transistor 320. The base is switched, thereby allowing current to flow at the collector. The collector of the bipolar junction transistor 320 is provided to the gate of field effect transistor 322, whose source switches to provide an output 324. The resulting solenoid output 324 is provided to the solenoid and to control the solenoid valve.

As discussed above, the engine RPM signal received along line 309 at the microcontroller 306 may be provided either from a tachometer input 326 or from pick-up input 328. Pick-up conditioning circuitry 304 is provided to "clean" the spark plug pulses and amplify and filter the pick-up input into a cleaner square wave. The pick-up conditioning circuitry 304 includes a pair of cascaded inverting amplifiers 312 and 314, the outputs of which are provided to the gate of field effect transistor 316. The switched signal resulting at the drain of field effect transistor 316 is provided via diode 317 to the base of bipolar junction transistor 318, which switches its collector to provide the signal at 309. The resulting engine RPM signal 309 is then provided from the collector of bipolar junction transistor 318.

Alternatively, the engine RPM signal 309 may be provided from the tachometer input 326. The signal is provided at the base of switching bipolar junction transistor 318. The switched engine RPM signal 309 is then provided from the collector of the bipolar junction transistor 318 and then to the microcontroller 306.

Figures 5, 5A:
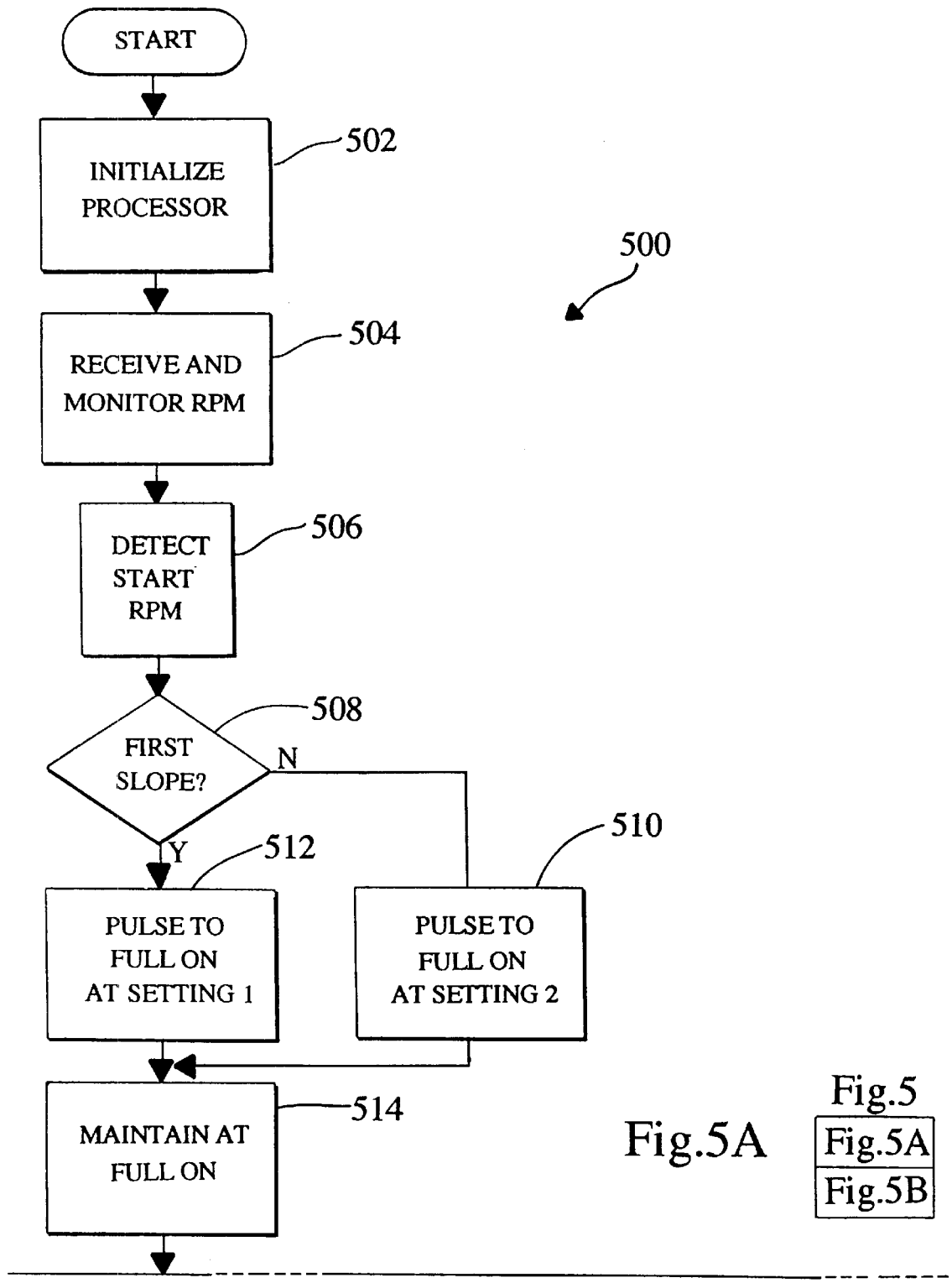
FIG. 5 is a flow chart illustrating a method according to an embodiment of the present invention.
Figure 5B:
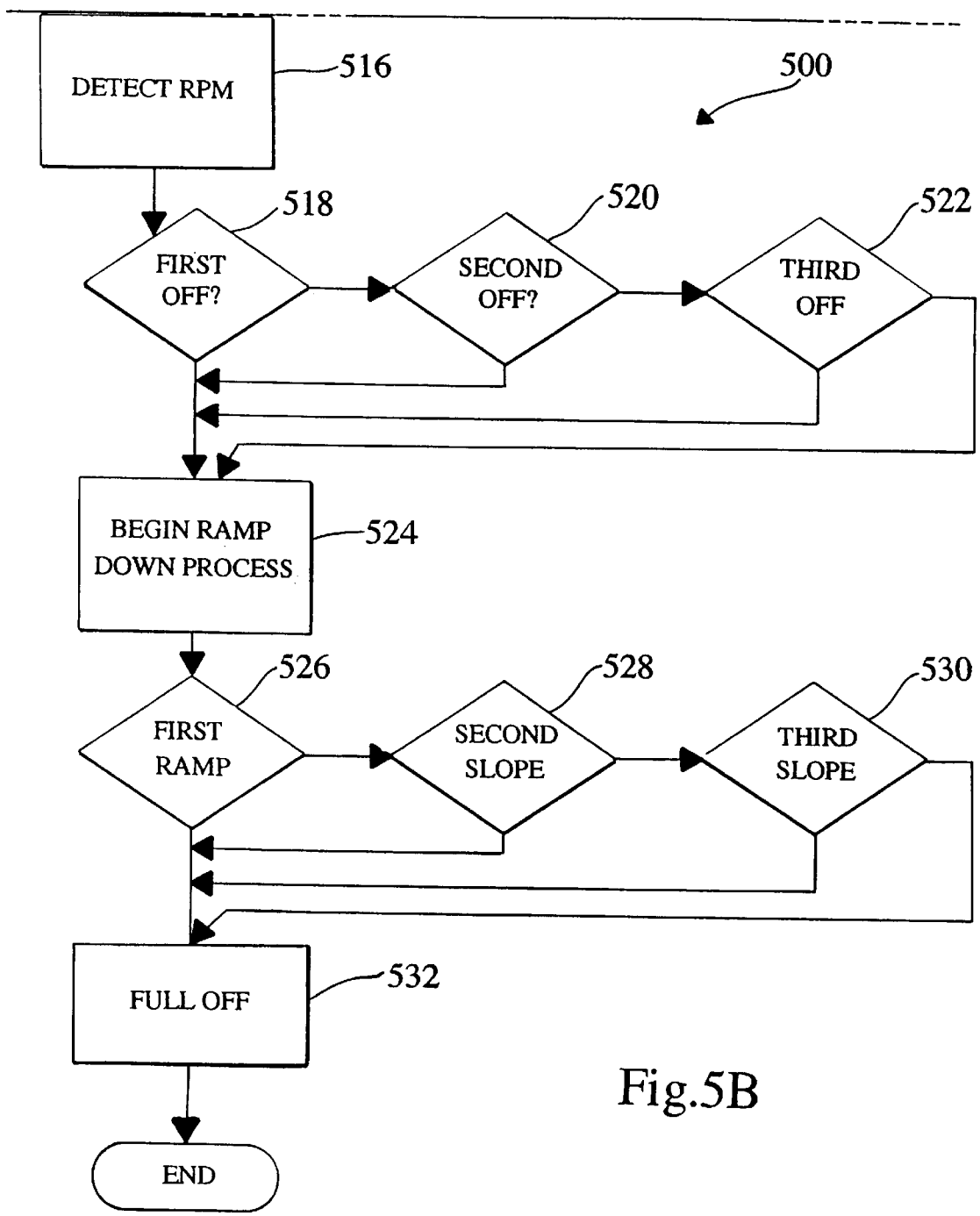

Turning now to FIG. 5, a flowchart illustrating operation of one embodiment of the method according to the present invention is shown. In a step 502, the processor or controller 306 is initialized. The initialization of the microcontroller 306 may include, for example, reading the inputs from the DIP switch 308. Once the microcontroller 306 has been initialized, the solenoid control electronics 300 begin to receive and monitor the RPM signal in a set 504. As discussed above, receiving the RPM signal includes receiving either a tachometer input 326 or a pick-up input 328. The resulting engine RPM signal 309 is then provided to the microcontroller 306. The microcontroller 306 includes, for example, a counter to count the resulting square wave pulses. The microcontroller, having been programmed with a BEGIN WATER TURN ON RPM level, will detect that level in a step 506. The microcontroller 306 will then determine whether it has been programmed to inject the water at a first rate or a second rate in a step 508. In either case, the microcontroller 306 will cause a solenoid to pulse and inject the water into the exhaust chamber at the appropriate rate in steps 510 or 512. The microcontroller 306 will maintain the solenoid in a FULL ON position for a predetermined, programmed period of time in a step 514. While doing so, the microcontroller 306 will continue to monitor the RPM levels in a step 516. The microcontroller 306 will then determine whether the DIP switch settings indicate that a first, second or third BEGIN TURN WATER OFF RPM levels have been programmed in steps 518, 520 and 522. Once the appropriate BEGIN TURN WATER OFF RPM level has been determined, the microcontroller will begin the ramp down process in a step 524. This includes pulsing the solenoid, thereby controlling the solenoid valve to allow decreasing amounts of water into the exhaust chamber. The microcontroller 306 will regulate the pulsing of the solenoid according to first, second or third slopes in steps 526, 528 and 530, until FULL WATER OFF has been achieved in a step 532. At that point, the solenoid will stop pulsing and the valve will remain closed.

The invention described in the above detailed description is not intended to be limited to the specific form set forth herein but on the contrary it is intended to cover such alternatives, modifications and equivalents as can reasonably be included within the spirit and scope of the appended claims. For example, it is noted that the relationship between RPM and percentage of water injected need not necessarily be linear; for example, the water may be introduced in a stepwise ON-OFF pattern, depending on the RPM level.

We claim:

1. A tunable exhaust chamber for attachment to an internal combustion engine, comprising:

an exhaust chamber coupled to receive exhaust gases from an internal combustion engine;

means for introducing a coolant into said exhaust chamber; and means operably coupled to said coolant introducing means for programmably tuning said exhaust chamber by introducing a predetermined amount of coolant into said exhaust chamber, said coolant introducing means including means for receiving an engine RPM (revolutions per minute) signal and a pulse width modulator (PWM) having a duty cycle responsive to said engine RPM signal, wherein said PWM controls a solenoid to open and close a valve responsive to said duty cycle to control introduction of said predetermined amount of coolant into said exhaust chamber.

2. A tunable exhaust chamber according to claim 1, wherein said PWM provides coolant as a linear function of said RPM signal.

3. A coolant injection system associated with an internal combustion engine, comprising:

a conduit connected to a source of coolant;

a valve positioned in said conduit to regulate introduction of coolant;

a solenoid coupled to control opening and closing of said valve; and a controller including a pulse width modulator (PWM) coupled to control said solenoid and responsive to an engine RPM signal from the internal combustion engine to govern operation of said solenoid.

4. A coolant injection system according to claim 3, wherein said PWM is programmable.

5. A coolant injection system according to claim 4, wherein said controller provides said coolant as a linear function of said engine RPM signal.

6. A method for tuning an exhaust chamber connected to an internal combustion engine, comprising:

receiving an engine RPM signal from the engine;

generating a pulse width modulated (PWM) control signal responsive to said engine RPM signal; and introducing coolant via a solenoid valve into an exhaust chamber responsive to said control signal.

7. A method according to claim 6, wherein said introducing coolant includes varying a duty cycle of said PWM depending on an engine RPM level.

8. A method according to claim 6, further including programming an RPM level at which said PWM control signal is activated.

9. A method according to claim 7, including programming a rate of change of said PWM duty cycle.

10. A control unit for allowing a user to controllably vary the predetermined tuning of an exhaust chamber of an internal combustion engine having engine operating modes with predetermined levels of performance, the control unit comprising:

a flow control mechanism having predetermined operating conditions for regulating flow of coolant to the exhaust chamber for increasing engine performance levels;

a controller which governs the operating condition of the flow control mechanism based on engine operating modes; and user input interfaces to the controller to allow a user to coordinate the operating condition of the flow control mechanism with the engine operating modes for providing an engine that is tuned to one of a plurality of different tuned states based on user preferences.

11. The control unit of claim 10 wherein the engine operating modes are different speeds at which the engine is operated, and the user input interfaces are selectable by the user to change the operating condition of the flow control mechanism at one of the different speeds to change the tuning of the engine.

12. The control unit of claim 10 wherein the flow control mechanism operating conditions include full flow, intermediate flow and no flow conditions, and the input interfaces include:

coolant full-on inputs to allow a user to select one of a plurality of predetermined engine speeds at which the flow control mechanism is in its full flow operating condition, coolant begin turn-off inputs to allow a user to select one of plurality of predetermined engine speeds at which the flow control mechanism is in its intermediate flow operating condition, and coolant full-off inputs to allow a user to select one of a plurality of predetermined engine speeds at which the flow control mechanism is in its no flow operating condition.

13. The control unit of claim 12 wherein the predetermined engine speeds selectable with the coolant full-on inputs are predetermined first engine speeds, the predetermined engine speeds selectable with the coolant begin turn-off inputs are predetermined second engine speeds, and the predetermined engine speeds selectable with the coolant full-off inputs are predetermined third engine speeds, with the first engine speeds being lower than the second engine speeds which are lower than the third engine speeds.

14. The control unit of claim 12 wherein the flow control mechanism is shifted from its no flow condition to its intermediate flow condition at a preset speed as preprogrammed in the controller to begin supplying coolant to the engine exhaust chamber with the preset speed being lower than the predetermined speeds selectable by the user via the user input interfaces.

15. The control unit of claim 10 wherein the flow control mechanism conditions include full flow, intermediate flow and no flow conditions, and the user input interfaces allow the user to select the operating mode of the engine at which the flow control mechanism shifts between its operating conditions and the rate of coolant flow through the flow control mechanism in its intermediate flow condition.

* * * * *